(12) United States Patent
Miller

(10) Patent No.: US 8,929,037 B2
(45) Date of Patent: *Jan. 6, 2015

(54) CIRCUIT INTERRUPTER PROVIDING GROUNDED NEUTRAL PROTECTION AND METHOD OF CONTROLLING THE SAME

(71) Applicant: Eaton Corporation, Cleveland, OH (US)

(72) Inventor: Theodore Miller, Oakdale, PA (US)

(73) Assignee: Eaton Corporation, Cleveland, OH (US)

( * ) Notice: Subject to any disclaimer, the term of this patent is extended or adjusted under 35 U.S.C. 154(b) by 129 days.

This patent is subject to a terminal disclaimer.

(21) Appl. No.: 13/748,848

(22) Filed: Jan. 24, 2013

(65) Prior Publication Data

US 2014/0204494 A1 Jul. 24, 2014

(51) Int. Cl.
*H02H 3/00* (2006.01)
*H02H 3/08* (2006.01)
*H02H 3/33* (2006.01)
*H02H 3/16* (2006.01)

(52) U.S. Cl.
CPC ............... *H02H 3/08* (2013.01); *H02H 3/331* (2013.01); *H02H 3/167* (2013.01)
USPC ........................................................ 361/42

(58) Field of Classification Search
USPC ........................................................ 361/42
See application file for complete search history.

(56) References Cited

U.S. PATENT DOCUMENTS

| 4,150,411 | A | 4/1979 | Howell | |
|---|---|---|---|---|
| 7,486,492 | B2 * | 2/2009 | Elms | 361/45 |
| 8,749,929 | B1 * | 6/2014 | Miller | 361/42 |
| 2005/0083616 | A1 | 4/2005 | Reid et al. | |
| 2007/0188955 | A1 | 8/2007 | Elms | |

OTHER PUBLICATIONS

European Patent Office, "International Search Report and Written Opinion", Mar. 19, 2014, 9 pp.

* cited by examiner

*Primary Examiner* — Stephen W Jackson
(74) *Attorney, Agent, or Firm* — Eckert Seamans Cherin & Mellott, LLC; Nathaniel C. Wilks

(57) ABSTRACT

A circuit interrupter includes a first electrical conductor, a second electrical conductor, separable contacts, an operating mechanism configured to open and close the separable contacts, and a trip circuit including a trip actuator configured to cooperate with the operating mechanism to trip open the separable contacts. The circuit interrupter also includes a ground fault detection circuit configured to sense a difference between currents through the first and second electrical conductors and to output an output signal based on the sensed difference, a power supply configured to convert alternating current power from the first and second electrical conductors to a direct current power, and a processor configured to receive the direct current power and the output signal. The processor is also configured to determine whether a characteristic of the power supply is present in the output signal and to control the trip circuit based on the determination.

24 Claims, 3 Drawing Sheets

CIRCUIT INTERRUPTER PROVIDING GROUNDED NEUTRAL PROTECTION AND METHOD OF CONTROLLING THE SAME

BACKGROUND

1. Field

The disclosed concept relates generally to electrical switching apparatus and, more particularly, to circuit interrupters. The disclosed concept further relates to circuit interrupters providing grounded neutral protection. The disclosed concept also pertains to methods of controlling circuit interrupters providing grounded neutral protection.

2. Background Information

One type of electrical switching apparatus is a circuit interrupter. Circuit interrupters, such as for example and without limitation, circuit breakers, are typically used to protect electrical circuitry from damage due to an overcurrent condition, such as an overload condition, a short circuit, or another fault condition, such as an arc fault or a ground fault. Circuit breakers typically include separable contacts. The separable contacts may be operated either manually by way of a handle disposed on the outside of a case or automatically in response to a detected fault condition. Typically, such circuit breakers include an operating mechanism, which is designed to rapidly open and close the separable contacts, and a trip mechanism, such as a trip unit, which senses a number of fault conditions to trip the breaker automatically. Upon sensing a fault condition, the trip unit trips the operating mechanism to a trip state, which moves the separable contacts to their open position.

One type of fault condition is a grounded neutral condition. UL943 specifies that a circuit interrupter should trip when the impedance between neutral and ground downstream of the circuit interrupter is 2 ohms or less. UL943 also specifies that the circuit interrupter must be capable of causing this trip without the application of a load current. However, without the application of a load current, the ground fault current is relatively small, thus making it difficult to detect a grounded neutral condition.

FIG. 1 is a circuit diagram of a system including a prior circuit interrupter 1 which is capable of detecting a grounded neutral condition without the application of a load current. The circuit interrupter 1 is electrically connected to a power source 2, a neutral 3, and a ground 20 on its upstream portion. The impedance between the load neutral and ground 20 on the downstream portion of the circuit interrupter 1 is represented by $R_1$. The circuit interrupter 1 includes first and second electrical conductors 5,6 electrically connected to outputs of the power source 2. The circuit interrupter 1 also includes separable contacts 7 and an operating mechanism 8 which is configured to open and close the separable contacts 7. The circuit interrupter 1 further includes a trip circuit which is electrically connected between the first and second electrical conductors 5,6. The trip circuit includes a trip actuator 9 which cooperates with the operating mechanism 8 to trip open the separable contacts 7. The trip actuator 9 includes a trip coil 10 which initiates tripping of the separable contacts 7 when sufficient current is passed therethrough. The trip actuator 9 also includes a silicon controlled rectifier (SCR) 11 which turns on and off to control whether current passes through the trip coil 10.

The circuit interrupter 1 includes a ground fault detection circuit which is capable of detecting a grounded neutral condition. The ground fault detection circuit includes a ground fault sensor 12 which senses a ground fault current as a difference between the current passing through the first electrical conductor 5 and the second electrical conductor 6. The ground fault detection circuit also includes an amplifier circuit 13 that converts the sensed ground fault current to a voltage and outputs it to a comparator circuit 16.

The ground fault detection circuit further includes a capacitor 14 and a grounded neutral transformer 15 which are electrically connected in series combination to the output of the ground fault amplifier circuit 13. The grounded neutral transformer 15 causes a positive feedback condition for the ground fault amplifier circuit 13, thus resulting in an unstable condition. More particularly, the ground fault amplifier circuit 13 oscillates at about the resonant frequency of the series combination of the capacitor 14 and grounded neutral transformer 15. The unstable condition causes an increase in the output of the ground fault amplifier circuit 13.

The comparator circuit 16 compares the output of the ground fault amplifier circuit 13 to a threshold voltage. When the output of the ground fault amplifier circuit 13 exceeds the threshold voltage, the comparator circuit 16 outputs a signal to the gate of the SCR 11 to turn on the SCR 11, thus allowing current to pass through the trip coil 10 and cause the separable contacts 7 to trip open.

Based on the increase in the output of the ground fault amplifier circuit 13 due to the instability of the ground fault detection circuit, the comparator circuit 16 is able to turn on the SCR 11 even when the ground fault current is relatively small. However, the addition of the capacitor 14 and grounded neutral transformer 15 to cause the instability results in an increase in the cost of the circuit interrupter 1.

There is room for improvement in circuit interrupters.

SUMMARY

These needs and others are met by embodiments of the disclosed concept, which provides a circuit interrupter capable of detecting a grounded neutral condition with a single ground fault current sensor. These needs and others are also met by embodiments of the disclosed concept, which provides a method of controlling a circuit interrupter capable of detecting a grounded neutral condition with a single ground fault current sensor.

In accordance with aspects of the disclosed concept, a circuit interrupter comprises: a first electrical conductor configured to electrically connect to a first output of a power source; a second electrical conductor configured to electrically connect to a second output of the power source or a neutral; separable contacts; an operating mechanism configured to open and close the separable contacts; a trip circuit electrically connected between the first electrical conductor and the second electrical conductor, the trip circuit including a trip actuator configured to cooperate with the operating mechanism to trip open the separable contacts; a ground fault detection circuit configured to sense a difference between a current through the first electrical conductor and a current through the second electrical conductor and to output an output signal based on the sensed difference; a power supply electrically connected between the first and second electrical conductors, the power supply being configured to convert alternating current power from the first and second electrical conductors to a direct current power; and a processor configured to receive the direct current power and the output signal, wherein the processor is configured to determine whether a characteristic of the power supply is present in the output signal and to control the trip circuit based on the determination.

Also in accordance with aspects of the disclosed concept, a method controls a circuit interrupter. The circuit interrupter comprises separable contacts, a trip circuit configured to control tripping of the separable contacts, a power supply configured to convert alternating current power received by the circuit interrupter to a direct current power, and a ground fault detection circuit configured to sense a ground fault current in the circuit interrupter and to output an output signal based on the sensed ground fault current. The method comprises: determining, by a processor, whether a characteristic of the power supply is present in the output signal; and controlling the trip circuit based on the determined characteristic.

Also in accordance with aspects of the disclosed concept, a non-transitory computer readable medium storing one or more programs, including instructions, which when executed by a computer, causes the computer to perform a method of controlling a circuit interrupter. The circuit interrupter comprises separable contacts, a trip circuit configured to control tripping of the separable contacts, a power supply configured to convert alternating current power received by the circuit interrupter to a direct current power, and a ground fault detection circuit configured to sense a ground fault current in the circuit interrupter and to output an output signal based on the sensed ground fault current. The method comprises: determining whether a characteristic of the power supply is present in the output signal; and controlling the trip circuit based on the determined characteristic.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
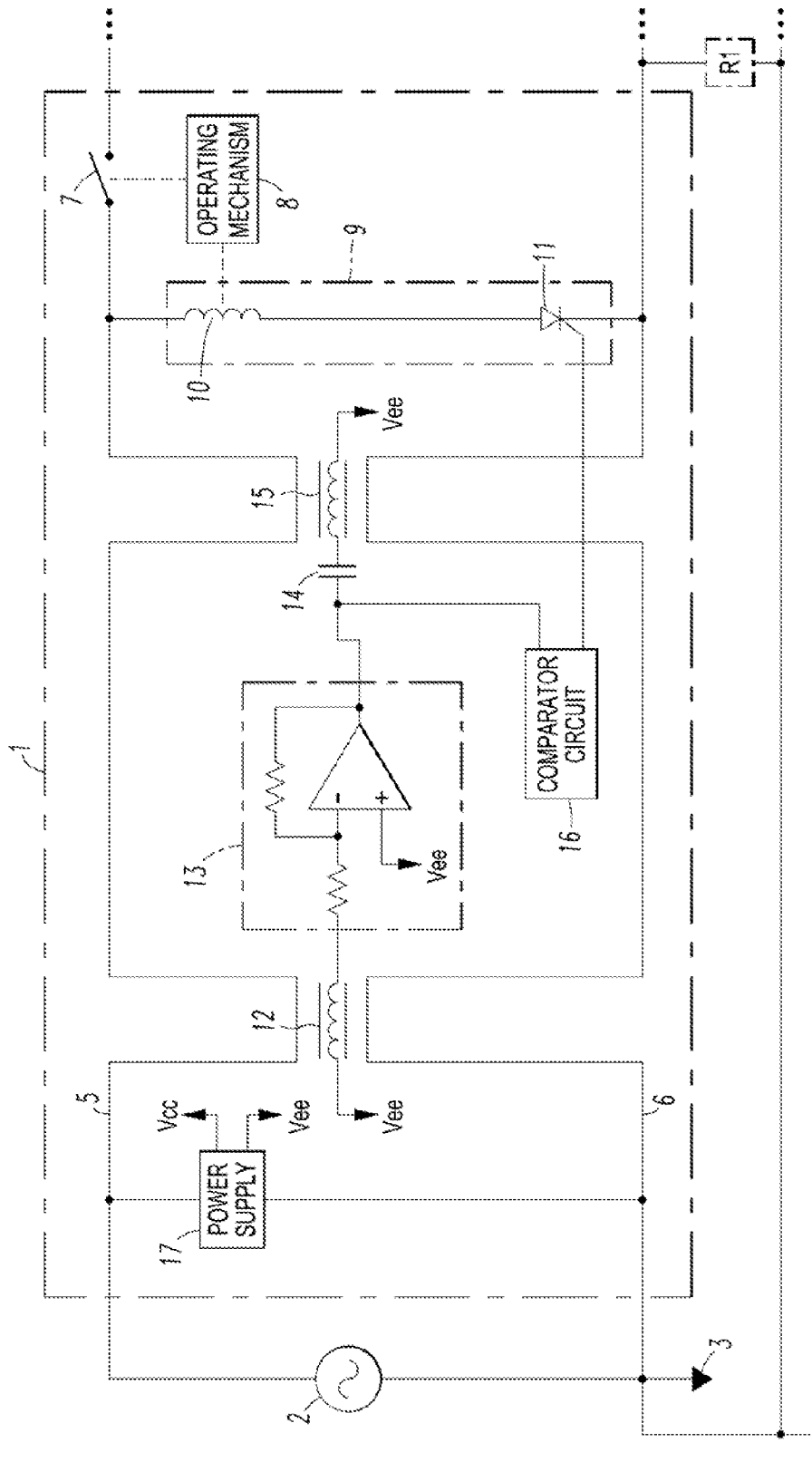
FIG. 1 is a circuit diagram of a system including a prior circuit interrupter.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

As employed herein, the term "number" shall mean one or an integer greater than one (i.e., a plurality).

As employed herein, the term "electrical conductor" shall mean a wire (e.g., without limitation, solid; stranded; insulated; non-insulated), a copper conductor, an aluminum conductor, a suitable metal conductor, or other suitable material or object that permits an electric current to flow easily.

As employed herein, the term "upstream portion of the circuit interrupter" and similar phrases shall mean a portion of the circuit interrupter which is electrically connected to a power source.

As employed herein, the term "downstream portion of the circuit interrupter" and similar phrases shall mean a portion of the circuit interrupter which is electrically connected to a load circuit and is opposite of the upstream portion of the circuit interrupter.

As employed herein, the term "processor" shall mean a programmable analog and/or digital device that can store, retrieve and process data; a controller; a control circuit; a computer; a workstation; a personal computer; a microprocessor; a microcontroller; a microcomputer; a central processing unit; a mainframe computer; a mini-computer; a server; a networked processor; or any suitable processing device or apparatus.

Figure 2:
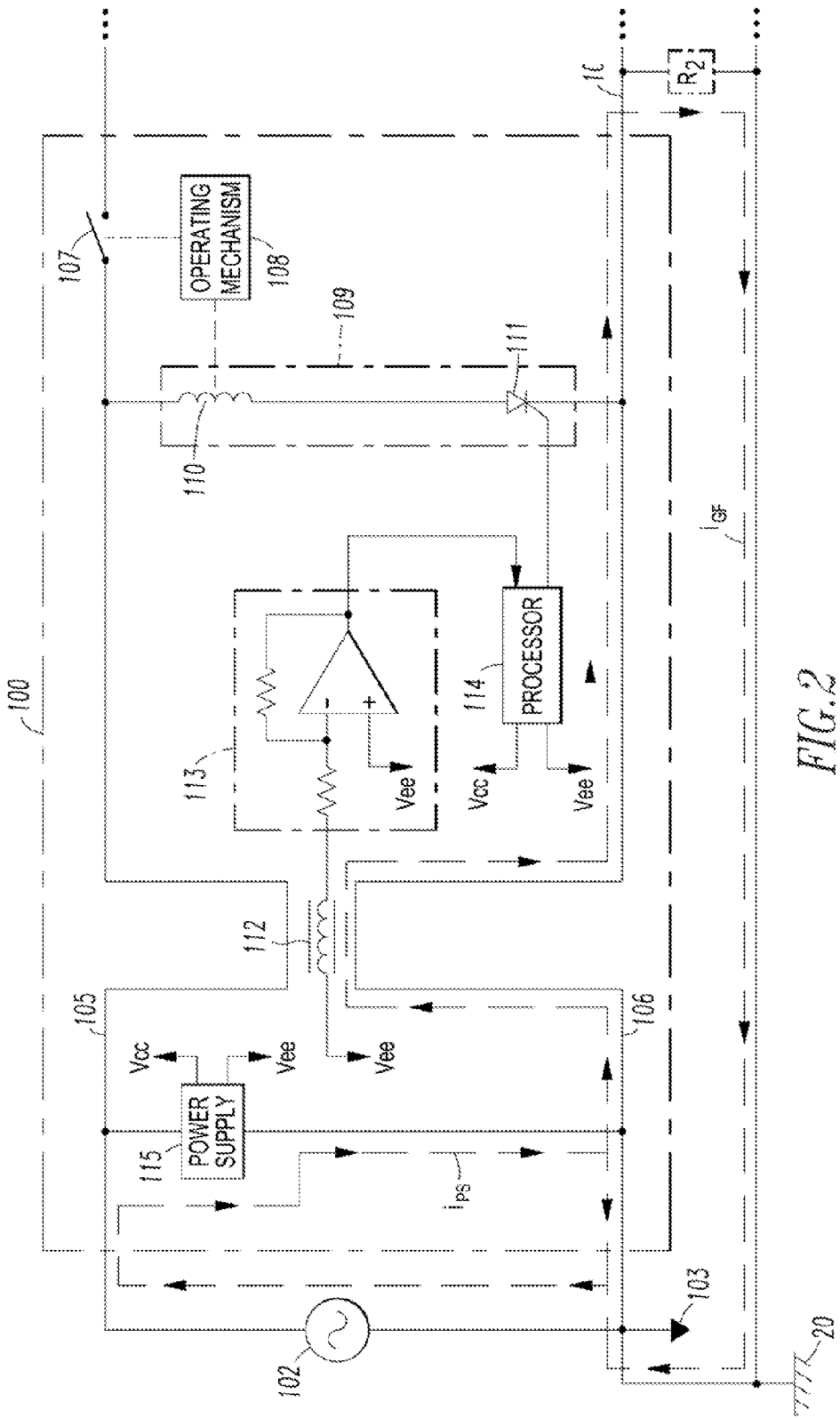
FIG. 2 is a circuit diagram of a system including a circuit interrupter in accordance with embodiments of the disclosed concept.

FIG. 2 is a circuit diagram of a system including a circuit interrupter 100. The circuit interrupter 100 is electrically connected to a power source 102, a neutral 103, and a ground 20 on its upstream portion (e.g., without limitation, side). The circuit interrupter 100 includes first and second electrical conductors 105,106 electrically connected to outputs of the power source 102. It will be appreciated that the second electrical conductor 106 can be electrically connected to a neutral 103 or both the output of the power source 102 and the neutral 103 without departing from the scope of the disclosed concept. Additionally, the power source 102 and/or neutral 103 is electrically connected to ground 20 upstream of the circuit interrupter 100. The impedance between the load neutral 104 and ground 20 on the downstream portion of the circuit interrupter 1 is represented by $R_2$. The circuit interrupter 100 also includes separable contacts 107 as well as an operating mechanism 108 configured to open and close the separable contacts 107.

The circuit interrupter 100 further includes a trip circuit which is electrically coupled between the first and second electrical conductors 105,106. The trip circuit includes a trip actuator 109 which cooperates with the operating mechanism 108 to trip open the separable contacts 107. The trip actuator 109 includes a trip coil 110 which initiates tripping of the separable contacts 107 when sufficient current is passed therethrough. The trip actuator 109 also includes a silicon controlled rectifier (SCR) 111 which turns on and off to control whether current passes through the trip coil 110. In another non-limiting example embodiment, the SCR 111 can be replaced with a triac (not shown). It will also be appreciated that in other non-limiting embodiments of the disclosed concept, the SCR 111 may be replaced by any other suitable switch (e.g., without limitation, a field effect transistor (FET)). Additionally, the trip actuator 109 can include a solenoid (not shown) which is actuated by the trip coil 110 and cooperates with the operating mechanism 108 to trip open the separable contacts 107.

The circuit interrupter 100 includes a ground fault detection circuit which includes a ground fault sensor 112 and a ground fault amplifier circuit 113. The ground fault detection circuit senses a difference between a current through the first electrical conductor 105 and a current through the second electrical conductor 106 and outputs an output signal based on the sensed difference.

In more detail, the ground fault sensor 112 is configured to sense a difference between a current through the first electrical conductor 105 and a current through the second electrical conductor 106. The ground fault sensor 112 outputs an output current based on the sensed difference. In the non-limiting example embodiment of FIG. 2, the ground fault sensor 112 is a current transformer. However, it will be appreciated that any suitable circuit which senses the difference between the current through the first electrical conductor 105 and the current through the second electrical conductor 106 and outputs an output signal based on the sensed difference may be used without departing from the scope of the disclosed concept.

The ground fault amplifier 113 is configured to convert the output current of the ground fault sensor 112 to an output voltage and to output the output voltage as the output signal to a processor 114. The disclosed ground fault amplifier circuit 113 is an inverting amplifier having first and second resistors and an operational amplifier. However, it will be appreciated that any suitable circuit which converts the output current to an output voltage may be employed without departing from the scope of the disclosed concept.

The circuit interrupter 100 further includes a power supply 115. The power supply 115 is electrically connected between the first and second conductors 105,106 and converts alternating current power carried by the first and second conductors 105,106 to direct current power (though outputs $V_{CC}$ and $V_{cc}$). The direct current power is used to power the processor 114.

The processor 114 receives the output signal from the ground fault detection circuit, analyzes the output signal, determines whether a characteristic of the power supply 115 is present in the output signal, and controls the trip circuit based on the determination.

In more detail, the power supply 115 draws current from the first conductor 105. This current can follow two paths, a first current path $i_{PS}$ and a second current path $i_{GF}$. On the first current path $i_{PS}$, the current flows between the power source 102 and the power supply 115 through the upstream portion of the circuit interrupter 100. On the second current path $i_{GF}$, the current drawn by the power supply 115 flows out of the downstream portion of the circuit interrupter 100 to ground 20 and back into the upstream portion of the circuit interrupter 100. The presence of current on the second current path $i_{GF}$ causes an imbalance in the amount of current flowing through the first and second conductors 105,106, which will be sensed by the ground fault sensor 112.

The ratio of the amount of current that flows through the first current path $i_{PS}$ and the amount of current that flows through the second current path $i_{GF}$ is based on the ratio of the neutral to ground impedance at the upstream portion of the circuit interrupter 100 to the neutral to ground impedance $R_2$ at the downstream portion of the circuit interrupter 100. As the ratio of the neutral to ground impedance at the upstream portion of the circuit interrupter 100 to the neutral to ground impedance $R_2$ at the downstream portion of the circuit interrupter 100 decreases, the amount of current that flows through the second current path $i_{GF}$ decreases. In the example embodiment of FIG. 2, the neutral 103 is tied to ground 20 at the upstream portion of the circuit interrupter 100. Thus, when the neutral to ground impedance $R_2$ at the downstream portion of the circuit interrupter 100 is relatively high, a negligible amount of the current will flow through the second current path $i_{GF}$. However, when the neutral to ground impedance $R_2$ at the downstream portion of the circuit interrupter 100 is relatively low (e.g., without limitation, a grounded neutral condition), the current flowing through the second current path $i_{GF}$ will increase. Determining that the current from the power supply 115 is present on the second current path $i_{GF}$ can be used as an indication that a grounded neutral condition exists.

To determine whether current from the power supply 115 is present on the second current path $i_{GF}$, the processor 114 analyzes the output signal of the ground fault detection circuit and determines whether a characteristic of the power supply 115 is present in the output signal. It will be appreciated that the characteristic of the power supply 115 can be any distinctive feature in the current drawn by the power supply 115.

In some example embodiments, circuit interrupter 100 is configured such that the processor 114 is able to determine that the current from the power supply 115 is present on the second current path $i_{GF}$ when the neutral to ground impedance $R_2$ at the downstream portion of the circuit interrupter 100 is 2 ohms or less.

Figure 3:
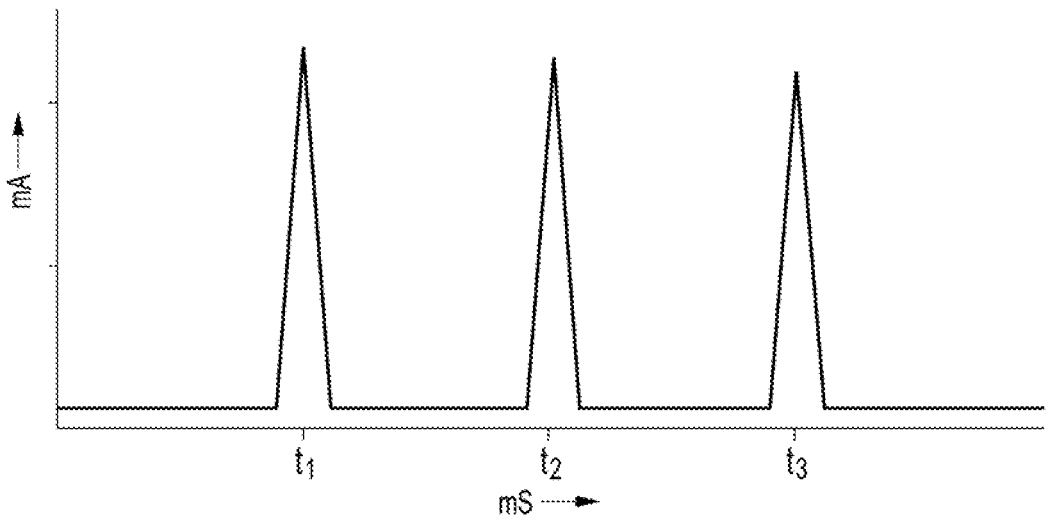
FIG. 3 is a plot of an example power supply characteristic in a ground fault current.

FIG. 3 is a plot of an example current drawn by the power supply 115. The current drawn by the power supply 115 includes a characteristic of repeating current peaks which correspond to zero-voltage crossings of the alternating current power supplied by the power source 102. The current peaks are located at times $t_1$, $t_2$, and $t_3$. Times $t_1$, $t_2$, and $t_3$ can represent periods of a periodic signal (e.g., without limitation, a 60 Hz signal). For example, a current peak can occur once during each period of a periodic signal. The current peak can also occur at a known phase angle in the periodic signal. If there is a grounded neutral condition in the protected circuit, the repeating current peaks will be sensed by the ground fault detection circuit and will be represented in the output signal of the ground fault detection circuit.

The processor 114 analyzes the waveform of the output signal and determines whether the repeating current peaks are present in the output signal (e.g., without limitation, by matching a shape of the output signal of the ground fault detection circuit to an expected shape of a characteristic of the power supply). If the repeating current peaks are present in the output signal, the processor 114 controls the trip circuit to trip open the separable contacts 107. The processor 114 may also determine whether the repeating current peaks are present in the output signal for a predetermined period of time so as to reduce the likelihood of false tripping.

While repeating current peaks are disclosed as a characteristic of the power supply 115, it is appreciated that the power supply 115 can have any other suitable characteristic without departing from the scope of the disclosed concept. In one example embodiment, the characteristic of the power supply can be a periodic turning on or rapidly increasing current (e.g., without limitation, a turning on or rapidly increasing current at a known phase angle of a 60 Hz waveform). In another example embodiment, the characteristic of the power supply can be a periodic turning off or rapidly decreasing current (e.g., without limitation, a turning off or rapidly decreasing current at a known phase angle of a 60 Hz waveform). The processor 114 can be configured to look for the periodic increase and/or decrease in the output signal.

In some example embodiments of the disclosed concept, the circuit interrupter 100 is configured such that the processor 114 is capable of detecting the characteristic of the power supply 115 in the output signal when the neutral to ground impedance $R_2$ downstream of the circuit interrupter 100 is 2 ohms. Additionally, in some example embodiments, the circuit interrupter 100 is configured such that the processor 114 is capable of detecting the characteristic of the power supply 115 without a load current.

Figure 4:
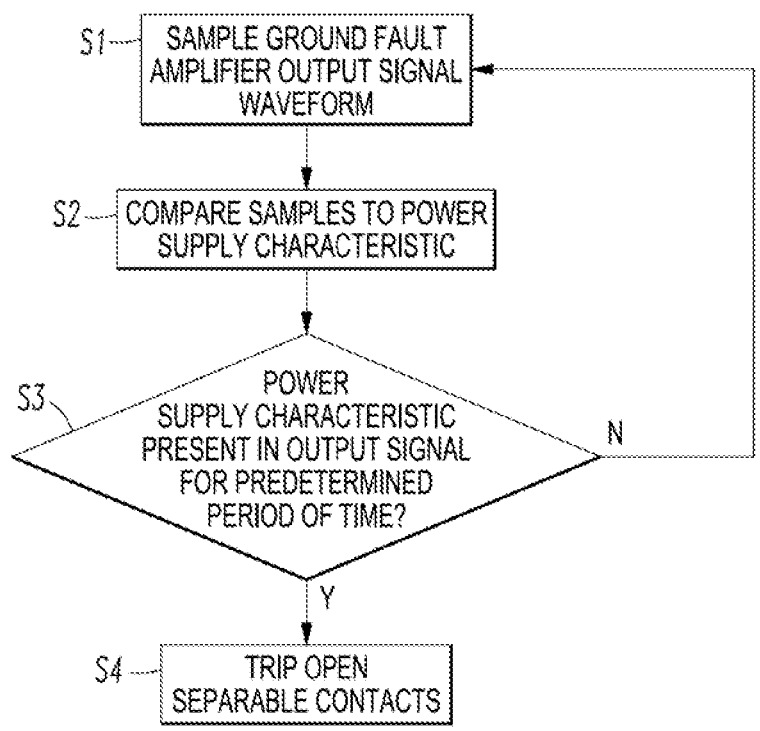
FIG. 4 is a flowchart of a method of controlling a circuit interrupter in accordance with an example embodiment of the disclosed concept.

FIG. 4 is a flowchart of a method of controlling the circuit interrupter 100 in accordance with a non-limiting example embodiment of the disclosed concept. The method may be implemented in, for example and without limitation, the processor 114. In operation S1, the ground fault amplifier 113 output waveform is sampled by the processor 114. In operation S2, the samples are compared to an expected power supply characteristic (e.g., without limitation, repeating current peaks). The expected power supply characteristic may be stored in the processor 114 or in a suitable memory device. In operation S3, it is determined whether the characteristic of the power supply 15 has been present in the output signal for a predetermined period of time (e.g., without limitation, ten consecutive 60 Hz cycles, or any other suitable time period). If the characteristic of the power supply 115 has not been present in the output signal for the predetermined period of time, the method returns to operation S1. If the characteristic of the power supply 115 has been present in the output signal for the predetermined period of time, the method proceeds to operation S4. In operation S4, the separable contacts 107 are controlled to trip open, for example and without limitation, by the processor 114 issuing a trip signal to the trip circuit 109.

Although single pole circuit interrupter 100 having one pair of separable contacts 107 is disclosed, a person of ordinary skill in the art will appreciate that the disclosed concept can be extended to a circuit interrupter having any number of poles and any number of separable contacts.

Although separable contacts 107 are disclosed, suitable solid state separable contacts can be employed. For example, the disclosed circuit interrupter 100 includes a suitable circuit interrupter mechanism, such as the separable contacts 107 that are opened and closed by the operating mechanism 108, although the disclosed concept is applicable to a wide range of circuit interruption mechanisms (e.g., without limitation, solid state switches like FET or IGBT devices; contactor contacts) and/or solid state based control/protection devices (e.g., without limitation, drives; soft-starters; DC/DC converters) and/or operating mechanisms (e.g., without limitation, electrical, electro-mechanical, or mechanical mechanisms).

The disclosed concept can also be embodied as computer readable codes on a tangible, non-transitory computer readable recording medium. The computer readable recording medium is any data storage device that can store data which can be thereafter read by a computer. Non-limiting examples of the computer readable recording medium include read-only memory (ROM), non-volatile random-access memory (RAM), CD-ROMs, magnetic tapes, floppy disks, disk storage devices, and optical data storage devices.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A circuit interrupter comprising:
   a first electrical conductor configured to electrically connect to a first output of a power source;
   a second electrical conductor configured to electrically connect to a second output of said power source or a neutral;
   separable contacts;
   an operating mechanism configured to open and close said separable contacts;
   a trip circuit electrically connected between the first electrical conductor and the second electrical conductor, said trip circuit including a trip actuator configured to cooperate with said operating mechanism to trip open said separable contacts;
   a ground fault detection circuit configured to sense a difference between a current through the first electrical conductor and a current through the second electrical conductor and to output an output signal based on said sensed difference;
   a power supply electrically connected between the first and second electrical conductors, said power supply being configured to convert alternating current power from the first and second electrical conductors to a direct current power; and
   a processor configured to receive said direct current power and said output signal,
   wherein the processor is configured to determine whether a characteristic of the power supply is present in said output signal and to control the trip circuit based on said determination.

2. The circuit interrupter of claim 1, wherein the characteristic of the power supply is a feature in a waveform of the output signal; and wherein the processor determines whether the characteristic of the power supply is present in the output signal by analyzing the waveform of the output signal.

3. The circuit interrupter of claim 2, wherein the characteristic of the power supply is a repeating feature in the waveform of the output signal.

4. The circuit interrupter of claim 3, wherein the characteristic of the power supply is a repeating peak in the waveform of the output signal.

5. The circuit interrupter of claim 3, wherein the characteristic of the power supply repeats at a predetermined phase angle in the waveform of the output signal.

6. The circuit interrupter of claim 1, wherein the processor controls the trip circuit to trip open the separable contacts when the processor determines that the characteristic of the power supply is present in the output signal for a predetermined period of time.

7. The circuit interrupter of claim 1, wherein the ground fault detection circuit further comprises:
   a ground fault sensor configured to sense the difference between the current through the first electrical conductor and the current through the second electrical conductor and to output an output current based on said sensed difference; and
   a ground fault amplifier circuit electrically connected to the ground fault sensor, the ground fault amplifier circuit being configured to convert said output current to an output voltage and to output said output voltage as said output signal.

8. The circuit interrupter of claim 7, wherein the ground fault amplifier circuit is an inverting amplifier circuit including a first resistor, a second resistor, and an operational amplifier.

9. The circuit interrupter of claim 1, wherein the trip actuator comprises a trip coil configured to initiate tripping open of said separable contacts when current is passed therethrough and a silicon controlled rectifier (SCR) configured to turn on and off to control whether current passes through the trip coil.

10. The circuit interrupter of claim 9, wherein the trip actuator further includes a solenoid which is actuated by the trip coil and cooperates with the operating mechanism to trip open said separable contacts.

11. The circuit interrupter of claim 1, wherein the processor is configured to sense the characteristic of the power supply in the output signal when a ground to neutral impedance downstream of the circuit interrupter is 2 ohms.

12. The circuit interrupter of claim 1, wherein the processor is configured to sense the characteristic of the power supply in the output signal when the circuit interrupter is not electrically connected to a load circuit.

13. A method of controlling a circuit interrupter comprising separable contacts, a trip circuit configured to control tripping of said separable contacts, a power supply configured to convert alternating current power received by the circuit interrupter to a direct current power, and a ground fault detection circuit configured to sense a ground fault current in the circuit interrupter and to output an output signal based on said sensed ground fault current, the method comprising:

determining, by a processor, whether a characteristic of the power supply is present in the output signal; and controlling the trip circuit based on the determined characteristic.

14. The method of claim 13, wherein the characteristic of the power supply is a feature in a waveform of the output signal; and wherein said determining by the processor whether the characteristic of the power supply is present in the output signal comprises analyzing the waveform of the output signal by the processor.

15. The method of claim 14, wherein the characteristic of the power supply is a repeating feature in the waveform of the output signal.

16. The method of claim 15, wherein the characteristic of the power supply is a repeating peak in the waveform of the output signal.

17. The method of claim 15, wherein the characteristic of the power supply repeats at a predetermined phase angle in the waveform of the output signal.

18. The method of claim 13, wherein said controlling the trip circuit based on the determined characteristic comprises controlling the trip circuit to trip open the separable contacts when it is determined that the characteristic of the power supply is present in the output signal for a predetermined period of time.

19. A non-transitory computer readable medium storing one or more programs, including instructions, which when executed by a computer, causes the computer to perform a method of controlling a circuit interrupter comprising separable contacts, a trip circuit configured to control tripping of said separable contacts, a power supply configured to convert alternating current power received by the circuit interrupter to a direct current power, and a ground fault detection circuit configured to sense a ground fault current in the circuit interrupter and to output an output signal based on said sensed ground fault current, the method comprising:

determining whether a characteristic of the power supply is present in the output signal; and controlling the trip circuit based on the determined characteristic.

20. The non-transitory computer readable medium of claim 19, wherein the characteristic of the power supply is a feature in a waveform of the output signal; and wherein said determining whether the characteristic of the power supply is present in the output signal comprises analyzing the waveform of the output signal.

21. The non-transitory computer readable medium of claim 20, wherein the characteristic of the power supply is a repeating feature in the waveform of the output signal.

22. The non-transitory computer readable medium of claim 21, wherein the characteristic of the power supply is a repeating peak in the waveform of the output signal.

23. The non-transitory computer readable medium of claim 21, wherein the characteristic of the power supply repeats at a predetermined phase angle in the waveform of the output signal.

24. The non-transitory computer readable medium of claim 19, wherein said controlling the trip circuit based on the determined characteristic comprises controlling the trip circuit to trip open the separable contacts when it is determined that the characteristic of the power supply is present in the output signal for a predetermined period of time.

* * * * *